(12) United States Patent
Xiao

(10) Patent No.: US 8,294,295 B2
(45) Date of Patent: Oct. 23, 2012

(54) POWER SUPPLY METHOD WITH PARALLEL-CONNECTED BATTERIES

(75) Inventor: Yan Yi Xiao, Fujian (CN)

(73) Assignee: Xiamen Lanxi Technology Co., Ltd., Xiamen, Fujian (CN)

( * ) Notice: Subject to any disclaimer, the term of this patent is extended or adjusted under 35 U.S.C. 154(b) by 332 days.

(21) Appl. No.: 12/786,383

(22) Filed: May 24, 2010

(65) Prior Publication Data

US 2011/0285208 A1 Nov. 24, 2011

(51) Int. Cl.
  *H02J 1/10* (2006.01)
(52) U.S. Cl. .......................................... 307/18
(58) Field of Classification Search ........... 307/18
  See application file for complete search history.

(56) References Cited

U.S. PATENT DOCUMENTS

| | | | | |
|---|---|---|---|---|
| 5,834,925 A | * | 11/1998 | Chesavage | 323/272 |
| 6,078,144 A | * | 6/2000 | Twardzik | 315/209 R |
| 6,208,039 B1 | * | 3/2001 | Mendelsohn et al. | 307/52 |
| 6,608,396 B2 | * | 8/2003 | Downer et al. | 290/40 C |
| 2006/0012312 A1 | * | 1/2006 | Lyle et al. | 315/194 |

* cited by examiner

*Primary Examiner* — Robert L. Deberadinis

(57) ABSTRACT

A power supply method with parallel-connected batteries employs at least two parallel-connected power supply branches, each of which includes a battery, a step-up circuit, and a step-down circuit, and each of which is installed with an individual control unit. The battery offers a low voltage transformed into a high voltage via the stepping-up. The high voltage thence acquires a needed power-supply voltage through the transformation executed by the step-down circuit. An anode of an output of the power supply branch serially connected with a diode prevents the other power supply branch from a reverse current. A cathode of the output serially connected with a current limiting resistance balances the currents on each power supply branch. Accordingly, the present invention diminishes the workload of the device maintenance, lessens users' investment pressure, and provides electricity systems of the power plant and the substation with a consistent direct current power source.

3 Claims, 1 Drawing Sheet

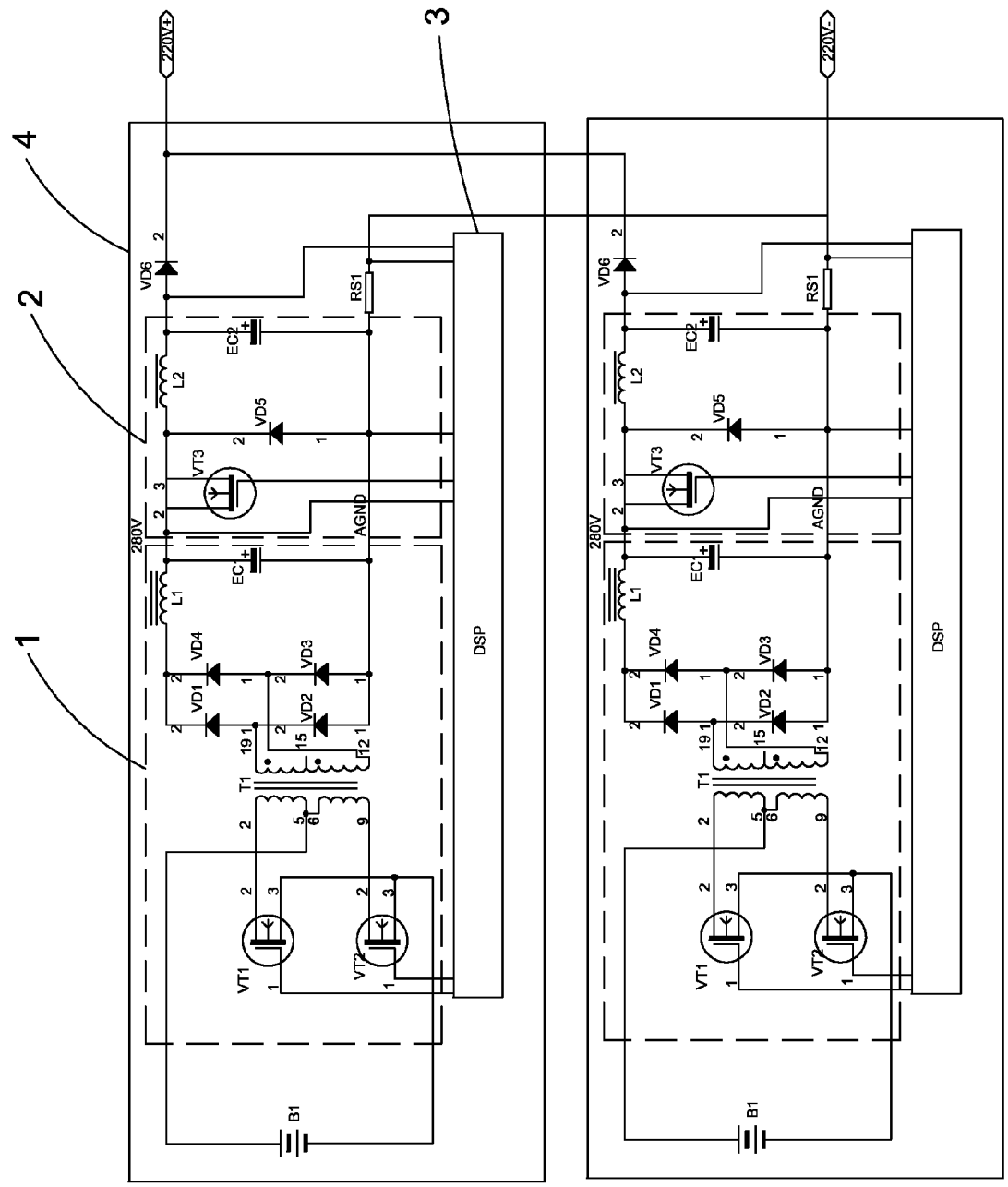

POWER SUPPLY METHOD WITH PARALLEL-CONNECTED BATTERIES

BACKGROUND OF THE INVENTION

1. Field of the Invention

The present invention relates to a power supply technique of the battery, especially to a power supply method with parallel-connected batteries applied to a direct current panel.

2. Description of the Related Art

The power plant or the substation generally adopts the direct current panel to serve as an electric power operating source. Wherein, the direct current panel substantially consists of a charging module and a battery set formed by multiple serially connected batteries. Conventionally, eighteen 12V batteries (or 108 single batteries) serially connected to form a 220V voltage, and nine 12V batteries (or 54 single batteries) serially connected to form a 110V voltage. Wherein, connected to the external mains electricity, the charging module provides a load with electricity and concurrently charges the battery set. Whereas, without the external mains electricity, the charging module is incapable of providing the load with electricity, thereby allowing the battery set to supply electricity to the load.

Although such direct current panel is able to provide a stable and incessant direct current to the load even if it is out of electricity, some shortcomings still exist in such invention:

First, if any one of the batteries breaks down, the power supply of the entire battery set will be influenced while the power failure happens; namely, the direct current panel cannot provide with a regular direct current voltage, thereby resulting in a hidden risk.

Second, since the battery set substantially comprises multiple batteries serially connected together, the inspection directed on each individual battery is quite inconvenient, which largely increases the workload during the related maintenance.

Third, in view of the multiple serially connected batteries, the combining manner thereof is somewhat limited. Thus, the price of the conventional direct current panel is high, thence incurring a high investing cost.

Obviously, the aforementioned inconvenience mainly results from the serially connected batteries. Therefore, an improvement is needed.

Accordingly, the inventor deliberates a power supply method with parallel-connected batteries to settle the existing problems.

SUMMARY OF THE INVENTION

It is an object of the present invention to provide a power supply method with parallel-connected batteries for ensuring a reliable output of a direct current to be provided by the direct current panel even if one of the batteries is out of function, thereby decreasing a cost and resulting in a convenient maintenance.

The object of the present invention is achieved by the following method:

A power supply method with parallel-connected batteries employs at least two parallelly connected power supply branches. Each of the power supply branches includes batteries, a step-up circuit, and a step-down circuit. Each power supply branch is further installed with an individual control unit. Additionally, the batteries provide with a lower voltage that would be transformed into a high voltage via the step-up circuit, thereby permitting the high voltage to be transformed into a desired power-supply voltage via the step-down circuit. An anode of the output of the power supply branch is serially connected with a diode for preventing another power supply branch from a reverse current. A cathode of the output is serially connected with a current limiting resistance for balancing currents generated from each of the power supply branches.

The step-up circuit adopts a push-pull circuit, the step-down circuit adopts a BUCK circuit, and the control unit adopts a digital signal processing unit DSP.

The push-pull circuit includes two field effective transistors, a transformer, four switch diodes, a filter inductance, and a capacitor. The two field effective transistors implement an alternate conduction, and the transformer senses a pulse current with the high voltage. Whereby, the pulse current passes through a bridge-rectifier circuit including four switch diodes so as to go through the filter inductance, thence achieving a high voltage at two ends of the capacitor.

The BUCK circuit includes a field effective transistor, a switch diode, an inductance, and a capacitor. In time of a conduction introduced by the field effective transistor, the inductance stores the magnetic field energy and recharges the capacitor via the inductance lowering the voltage, thereby concurrently providing a load with electricity. A cutting-off of the field effective transistor allows the conduction of the diodes to be implemented and permits the switch diodes, the inductance, and the capacitor to form a circuit. Therefore, the magnetic field energy stored in the inductance preferably charges the capacitor, so that the capacitor is able to provide the load with electricity and provide two ends thereof with needed power supply voltage via the alternate conduction of the field effective transistor.

The digital signal processing unit DSP is connected to all gate electrodes of the field effective transistor and to all anodes of the two capacitors as well as to two ends of the current limiting resistance. The digital signal processing unit DSP controls the alternate conductions of the two field effective transistors in the push-pull circuit. According to a feedback voltage of the anodes on the two capacitors and a feedback current of two ends of the current limiting resistance, a space ratio of the field effective transistor of the BUCK circuit is able to be adjusted, thereby promoting the power supply performance of the power supply branches via clamping down the power supply voltage on a needed value and maintaining a current stability of the power supply branches.

Accordingly, the battery set of the present invention utilizes at least two power supply branches parallelly connected together to provide the electricity, rather than utilize the conventional serial connection. Further by means of each power supply branch being individually installed on a plate, the rest power supply branches can still provide with electricity as usual even if any one of the power supply branches malfunctions. Wherein, afore damaged plate could be individually disassembled for implementing the inspection, which is very convenient and whose maintenance workload is concurrently less heavy. While applying such power supply method to the direct current panel, the switch equipment and the secondary meter of the power plant and the substation could be more effectively provided with a more reliable direct current power source even if the external electricity is cut off. Moreover, a less number of the batteries could still accomplish the same power supply result, which manifestly reduces the cost and helps users lessen their investment pressure.

As it should be, users are able to adopt either different batteries or batteries with lower voltage caused by divergent assembling means in accordance with their practical needs. For example, the low voltage could be respectively formed by a 12V battery, a 24V battery, or a 48V battery. Alternatively, a 24V low voltage could be arranged by 2 serially-connected 12V batteries. That is to say, while simply varying device parameters applied in the push-pull circuit and the BUCK circuit, a wide variety of batteries could be transformed into a desired power-supply voltage. In addition to adjusting the space ratio of the field effective transistor on the BUCK circuit, the power supply branch is able to acquire distinct values of the power-supply voltage, such as 110V or 220V. As a result, a single direct current panel is capable of providing assorted load circuits with electricity via simply adjusting one of the device parameters in the circuit; different types of the direct current panels are no more needed. Preferably, the present invention promotes the high efficiency and lowers the cost.

BRIEF DESCRIPTION OF THE DRAWINGS

FIG. 1 is a circuit diagram showing a preferred embodiment of the present invention.

DETAILED DESCRIPTION OF THE PREFERRED EMBODIMENTS

FIG. 1 shows a circuit diagram of a preferred embodiment of the present invention. Two power supply branches 4 are parallelly connected, and a 24V low voltage is transformed into a 220V power-supply voltage. Wherein, each power supply branch 4 has the same structure, i.e., a battery B1, a push-pull circuit 1, a BUCK circuit 2, and a digital signal processing unit DSP 3.

The 24V of the battery B1 is formed by two 12V batteries serially connected together, and the battery provides a low voltage.

The push-pull circuit 1 is served as a step-up circuit of the power supply branch 4 so as to transform the 24V low voltage in the battery B1 into a 280V high voltage. Referring to FIG. 1, the push-pull circuit 1 includes two field effective transistor, a transformer, four switch diodes, a filter inductance, and a capacitor. An anode of the battery B1 is connected to the fifth as well as the sixth joints of the transformer T1, a cathode of the battery B1 is connected to the third joints of the field effective transistors VT1, VT2, the second joint of the field effective transistor VT1 is connected to the second joint of the transformer T1, and the second joint of the field effective VT2 is connected to the ninth joint of the transformer T1. The switch diodes VD1, VD2, VD3, and VD4 integrally form a bridge-rectifier circuit. Additionally, the nineteenth joint of the transformer T1 is connected to an anode of the switch diode VD1 and a cathode of the switch diode VD2, and the twelfth joint of the transformer T1 is connected to an anode of the switch diode VD4 and a cathode of the switch diode VD3. Accordingly, while the cathodes of the switch diodes VD1 and VD4 are parallelly connected to attach to an anode of the capacitor EC1 through an inductance L1, and while the cathodes of the switch diodes VD2 and VD3 are parallelly connected to attach to a cathode of the capacitor EC1, the push-pull circuit 1 is formed. Herein, the 24V voltage of the battery set B1 is augmented to a 280V direct current voltage at two ends of the capacitor EC1.

The BUCK circuit 2 served as a step-down circuit of the power supply branch 4 is able to transform the enhanced 280V high voltage into the 220V power-supply voltage. Referring to FIG. 1, the BUCK circuit 2 includes a field effective transistor, a switch diode, an inductance, and a capacitor. While the second joint of the field effective transistor VT3 is connected to an anode of the capacitor EC1 in the push-pull circuit 1, the third joint of the field effective transistor VT3 is connected to a cathode of the switch diode VD5, the inductance L2 is connected to an anode of the capacitor EC2, and an anode of the switch diode VD5 is connected to the cathodes of the capacitors EC1 and EC2, the BUCK circuit 2 is formed. Herein, the 280V voltages at two ends of the capacitor EC1 are transformed into the 220V power-supply voltages at two ends of the capacitor EC2.

In order to efficiently prevent the other power supply branches 4 from a reverse current, the anode of the capacitor EC2 is connected to an anode of an output via a diode VD6. Concurrently, to facilitate the current balance between the power supply branches 4, the cathode of the capacitor EC2 is connected to a cathode of the output via a current limiting resistance RS1.

The digital signal processing unit DSP 3 served as a control unit of the power supply branch 4 is connected to the first joints of the field effective transistors VT1, VT2, and VT3 as well as connected to the anodes of the capacitors EC1, EC2, and connected to the two ends of the current limiting resistances RS1, respectively.

While the power supply branches 4 work, the field effective transistors VT1 and VT2 execute the alternate conductions by means of the driving and controlling of the digital signal processing unit DSP 3. Whereby, the current of the battery alternatively passes through a primary coil 5-2 and a coil 6-9 of the transformer T1, and a secondary coil 12-19 of the transformer T1 further senses a pulse current of the high voltage. Thereby, a 280V direct current high voltage at two ends of the capacitor EC1 could be achieved via the rectification by the bridge-rectifier circuit and via the filtration by the filter inductance L1.

The digital signal processing unit DSP 3 loopingly controls the conduction and cutting-off of the field effective transistor VT3. Accordingly, during the conduction of the field effective transistor VT3, the inductance L2 stores the magnetic field energy to form a voltage drop. By means of the inductance L2 lowering the voltage for the capacitor EC2 to charge, the voltages at the two ends thereof would be augmented, and concurrently the load would be provided with electricity. In time of the field effective transistor VT3 being cut-off, the two ends of the inductance L2 is able to sense the reverse electromotive force, thereby forcing the conduction of the diode VD5 to be executed. Consequently, the diode VD5, the inductance L2 and the capacitor EC2 form a circuit, and the magnetic field energy stored in the inductance L2 continues to charge the capacitor EC2. Concomitantly, the capacitor EC2 provides the load with electricity. Herein, since the magnetic field energy is insufficient for upholding the load current, the voltage of the capacitor EC2 is accordingly reduced. A ratio of the conducting time and the cutting-off time of the field effective transistor VT3 (namely, the space ratio) brings about the voltage values at the two ends of the capacitor EC2. Wherein, when the digital signal processing unit DSP 3 selects a suitable space ratio, the needed power-supply voltage will be maintained up to 220V.

The diode VD6 on the anode of the output efficiently prevents the other power supply branches 4 from a reverse current. The current limiting resistance RS1 is served to balance the load current. Namely, if the load current is rising, the digital signal processing unit DSP 3 would inspect the rising of the voltage values at two ends of the current limiting resistance RS1. Herein, the space ratio of the field effective transistor VT3 is controlled to reduce so as to allow the voltages at two ends of the capacitor EC2 to be accordingly decreased, thereby lessening the load current. In addition, while the load current is dwindled, the digital signal processing unit DSP 3 will inspect diminishing of the voltage values at two ends of the current limiting resistance RS1. That is, the space ratio of the field effective transistor VT3 is controlled to augment so as to allow the voltages at two ends of the capacitor EC2 to be increased, thereby concurrently raising the load current. Therefore, the load current could be balanced via the disposition of the current limiting resistance RS1. Moreover, in view of the connection between the diode VD6 and the current limiting resistance RS1, the current of each power supply ranch 4 is maintained at the same level, thereby promoting the stability of the power supply efficiency of each power supply ranch 4 through the parallel connection.

Accordingly, an integral power supply branch 4 is achieved. Favorably, users could parallelly connect multiple power supply branches 4 in accordance with their needs, thereby accomplishing a flexible application.

As it should be, in the practical application to the direct current panel, N+1 power supply branches 4 are parallelly connected, i.e. the redundancy. For example, a load has to be satisfied for a regular operation, and N power supply branches 4 are needed; then in reality, N+1 power supply branches 4 have to be parallelly connected. Preferably, if one of the power supply branches 4 breaks down, the direct current panel will still satisfy the load for accomplishing the regular power voltage; accordingly, said malfunctioned power supply branch 4 could be safely replaced.

Evidently, the battery set of the present invention does not apply the conventional serial connection to supply electricity. Preferably, at least two power supply branches 4 are parallelly connected to supply electricity. As a result, even if one of the power supply branches 4 fails, the rest power supply branch 4 will still normally provide with electricity, rather than be influenced. Thus, while the external electricity is cut off, a real effective direct current power source is provided to ensure the permanence of the switch device and the secondary meter in the power plant and the substation.

Favorably, the manufacturer could individually install each power supply branch 4 on a single plate. Thereby, while any one of the power supply branch 4 breaks down, the repairer could just simply dismantle the corresponding failed plate. Obviously, the inspection on the device is convenient and swift, and the workload of the device maintenance is preferably diminished.

In the meanwhile, fewer batteries could still achieve the same power supply effect, thereby greatly lessening the cost and users' investment pressure. Alternatively, users could selectively adopt distinct batteries to serve as the low voltage in accordance with the practical condition, like the 12V, 24V, or the 48V battery. Herein, users simply vary the device parameters applied to the push-pull circuit 1 and the BUCK circuit 2, and a power-supply voltage of a same level could be favorably provided. In addition to adjusting the space ratio of the field effective transistor VT3 on the BUCK circuit 2, a single power supply branch 4 is able to acquire divergent power-supply voltages, like an 110V voltage and a 220V voltage. As a result, such direct current panel provides the different load circuit with electricity through simply adjusting one of the devices in the circuit, so that users need not buy the different types of the direct current panels, and the present invention preferably promotes the high efficiency as well as lowers the cost.

I claim:

1. A power supply method with parallel-connected batteries;
    characterized in that at least two power supply branches being connected parallelly;
    each power supply branch including
        a battery set comprising of batteries providing a low voltage,
        a step-up circuit, implemented as a push-pull circuit for transforming the low voltage into a high voltage, including
            two field effective transistors, VT1 and VT2,
            a transformer,
            four switch diodes,
            a filter inductance, and
            a capacitor EC1;
        a step-down circuit, implemented as a BUCK circuit for transforming said high voltage to a desired power-supply voltage, including
            a switch diode VD5,
            a filed effective transistor VT3,
            a capacitor EC2,
            an inductance, and
        an individual control unit of a digital signal processing unit DSP, connects to gate electrodes of VT1, VT2, and VT3, to anodes of EC1 and CE2, and to two ends of a current limiting resistance, respectively;
    an output of said power supply branch being serially connected with a diode for preventing another power supply branch from a reverse current;
    a cathode of said out put being serially connected with said current limiting resistance for balancing currents,
    wherein said digital signal processing unit DSP controls alternate conductions of said two field effective transistors VT1 and VT2;
    based on a feedback voltage of said capacitors EC1 and EC2 and a feedback current of said current limiting resistance, a space ratio of said field effective transistor VT3 is adjusted for reducing said high voltage to the desired power-supply voltage.

2. The power supply method as claimed in claim 1, wherein said two field effective transistors VT1 and VT2 implement an alternate conduction, and said transformer senses a pulse current with said high voltage;
    whereby, said pulse current passes through a bridge-rectifier circuit including said four switch diodes for going through the filter inductance, thence achieving said high voltage at two ends of the capacitor EC1.

3. The power supply method as claimed in claim 1, wherein in time of a conduction introduced by said field effective transistor VT3, said inductance stores the magnetic field energy and recharges said capacitor EC2 via said inductance lowering said voltage.

* * * * *